Sept. 1, 1936.  A. A. PREVOST  2,052,941
MILK BOTTLE STOPPER
Filed Oct. 14, 1935
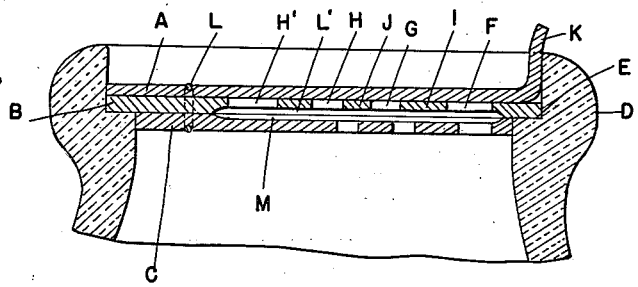
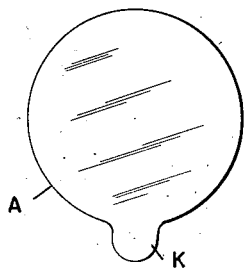
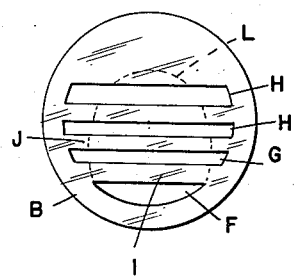
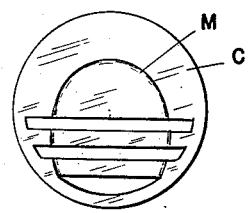
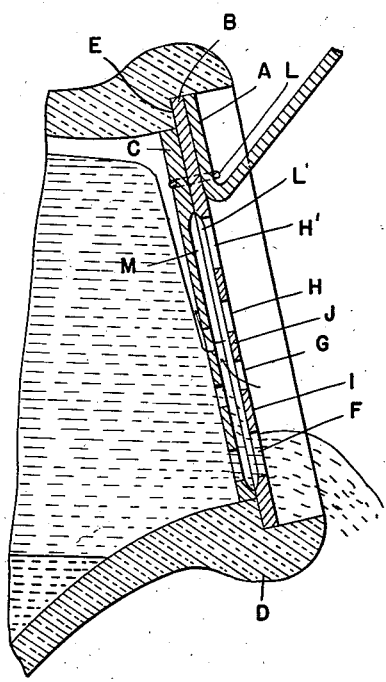
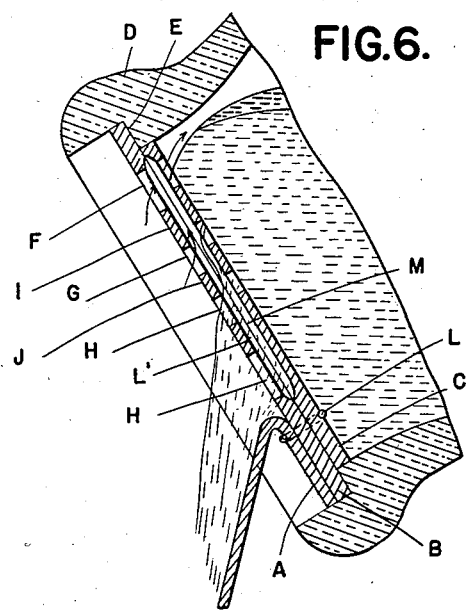
*INVENTOR*
ARTHUR A. PREVOST
BY *Whittemore Hulbert*
*Whittemore & Belknap*
*ATTORNEYS*

Patented Sept. 1, 1936

2,052,941

UNITED STATES PATENT OFFICE 2,052,941

MILK BOTTLE STOPPER

Arthur A. Prevost, Detroit, Mich.

Application October 14, 1935, Serial No. 44,965

7 Claims. (Cl. 210—51.5)

The invention relates to milk bottle stoppers and has for its object the obtaining of a construction which in addition to its use as a seal can be employed for separating the cream from the milk. To this end the invention consists in the construction as hereinafter set forth.

In the drawing:

Figure 1 is a cross-section through the upper portion of a milk bottle showing my improved stopper applied thereto;

Figures 2, 3 and 4 are plan views of the several portions which when assembled produce the stopper;

Figure 5 is a section similar to Figure 1 showing the manner of removing the top portion of the cream;

Figure 6 is a similar view showing the operation of separating the last of the cream from the milk.

Where milk is delivered in bottles, it is quite customary to pour off a portion of the cream which rises to the top of the bottle. If, however, it is desired to effect a complete separation between the cream and the skimmed milk this is difficult to do as the agitation incident to pouring will again commingle a portion of the cream with the under-lying milk. To overcome this defect, I make use of a principle long known to housewives which consists in blowing back the layer of cream on the surface of the milk at the same time that the underlying milk is poured from one edge of the container. To automatically accomplish this effect I have devised a construction of milk bottle cap or stopper which during the pouring creates an inward current of air close to the surface of the liquid. The construction is as follows.

A, B, and C are cardboard disks which together form the bottle cap. The disks A and B are of a size to fit within the mouth of the bottle D above the shoulder E therein, while the disk C is of smaller diameter so as to fit within a contracted portion beneath said shoulder. The disks B and C are provided with a series of slots F, G and H which extend parallel to each other from one edge of the cap to slightly beyond the middle thereof. These slots are not, however, in exact registration in the two disks, but are so arranged that the intermediate bars I and J in the disk B slightly overlap the slots in the disk C. Between the slotted portions of the disks B and C is formed a thin air channel preferably by recessing the adjacent surfaces of these disks, as indicated at L' and M. This will form an air passage which extends between the bars I and J from the lowermost to the top slot of the series. The disk A is imperforate and is provided at one edge with a tab K or other means by which it may be lifted. All of the disks are then secured to each other in the unslotted portion thereof by a suitable fastening device such as indicated at L.

With the construction as described, when it is desired to separate the cream from the milk the tab K is pulled to lift a portion of the outer disk A, while leaving the other disks in position. The bottle is then turned as shown in Figure 5 with the slot F at the bottom and the top portion of the cream is poured out through this slot. Figure 5 shows the operation after a portion of the cream has been poured off, but before there is any appreciable mixing of the milk and cream. To separate the remaining portion of the cream the bottle is reversed in position so as to bring the slot F at the top and the slot H at the bottom of the series. The bottle is then tipped, and the milk is poured through the lower slots, while at the same time air passing through the chamber between the disks B and C formed by the recesses L' and M will create a thin inwardly directed current of air over the surface of the liquid blowing the cream back from the pouring edge. This will continue as long as the milk is poured leaving the remaining cream unmixed with the milk in the bottle. The result is that the milk removed is practically free from cream and at the end of the pouring there remains a portion which is largely cream.

What I claim as my invention is:

1. A milk and cream separator for milk bottles comprising a plurality of adjacent disks having substantially parallel slots therein that are slightly out of registration, the slots in one disk being substantially parallel to the slots in the other disk, said disks being arranged to form a thin recess therebetween for the purpose described.

2. A milk and cream separator for milk bottles comprising a pair of disks for engaging the mouth of the bottle, one of said disks being of the diameter to fit over the shoulder in said bottle and the other disk being restricted in diameter to fit within the portion of the bottle beneath said shoulder, said disks being provided with a series of parallel slots, the slots in one of said disks being substantially parallel to and slightly out of registration with the slots in the other of said disks, and said disks being also formed with a thin recess therebetween for the purpose described.

3. A combined milk bottle closure and milk and cream separator comprising a series of disks secured to each other, the outermost disk of the series being imperforate, and the inner disks of the series having substantially parallel slots therein, the slots in said inner disks being slightly out of registration, the slots in one of said inner disks being substantially parallel to the slots in the other of said inner disks, said inner disks being also formed with a thin recess between the adjacent faces of the slotted portions for the purpose described.

4. A combined milk bottle closure and milk and cream separator comprising three disks secured to each other at one side, the outermost disk being imperforate, the innermost disk being provided with a series of parallel slots extending from the side opposite the secured portions to slightly beyond the middle of the disk, and the intermediate disk also having a series of substantially parallel slots therein, the slots in the intermediate disk being substantially parallel to and slightly out of registration with the slots in the innermost disk, the intermediate and innermost disks being provided therebetween with a thin recess for the purpose described.

5. A combined milk bottle closure and milk and cream separator comprising three disks secured to each other at one side, the outermost disk being imperforate, the innermost disk being provided with a series of substantially parallel slots, the intermediate disk also having a series of substantially parallel slots therein, the slots in the intermediate disk being substantially parallel to and slightly out of registration with the slots in the innermost disk, and the adjacent surfaces of said innermost and intermediate disks being recessed to provide a thin air channel therebetween for the purpose described.

6. A combined milk bottle closure and milk and cream separator comprising three disks secured to each other at one side, the outermost disk being imperforate, the innermost and intermediate disks having substantially parallel slots therein and the adjacent surfaces of said innermost and intermediate disks being recessed to provide a thin air channel therebetween for the purpose described.

7. A combined milk bottle closure and milk and cream separator comprising three disks secured to each other at one side, the outermost disk being imperforate, the innermost and intermediate disks having pouring openings therein, the openings in the innermost disk being slightly out of registration with the openings in the intermediate disk, and the adjacent surfaces of said innermost and intermediate disks being recessed to provide a thin air channel therebetween for the purpose described.

ARTHUR A. PREVOST.